United States Patent [19]

Thompson

[11] Patent Number: 4,823,396
[45] Date of Patent: Apr. 18, 1989

[54] AUTOMATED FASTENER INSPECTION SYSTEM

[75] Inventor: Douglas Thompson, Redmond, Wash.

[73] Assignee: The Boeing Company, Seattle, Wash.

[21] Appl. No.: 76,166

[22] Filed: Jul. 21, 1987

[51] Int. Cl.$^4$ .............................................. G06K 9/00
[52] U.S. Cl. ........................................ 382/8; 382/1; 358/107; 29/DIG. 78; 209/906; 250/560; 406/83
[58] Field of Search ................ 358/107; 356/376, 383, 356/384, 385; 364/560, 562, 533, 564; 382/1, 8, 58; 209/929, 198, 906; 193/32; 406/34, 36, 83; 250/560, 561; 29/34 A, 712, DIG. 78

[56] References Cited

U.S. PATENT DOCUMENTS

| | | |
|---|---|---|
| 8,082 | 5/1851 | Sloan . |
| 2,474,906 | 7/1949 | Meloon ................................. 88/14 |
| 3,060,791 | 10/1962 | Tarczy-Hornoch .................... 88/14 |
| 3,224,322 | 12/1965 | Westbrook ............................ 88/14 |
| 3,650,397 | 3/1972 | Bornemeier ......................... 209/80 |
| 3,804,270 | 4/1974 | Michaud et al. ..................... 214/16 |
| 3,867,593 | 2/1975 | Kryah et al. ......................... 406/34 |
| 4,055,889 | 11/1977 | Fusco et al. ......................... 29/710 |
| 4,271,477 | 6/1981 | Williams .............................. 364/563 |
| 4,341,311 | 7/1982 | Gold et al. .......................... 209/929 |
| 4,393,401 | 7/1983 | Gorenflo et al. .................... 358/107 |
| 4,394,683 | 7/1983 | Liptay-Wagner et al. ........... 358/107 |
| 4,414,566 | 11/1983 | Peyton et al. ....................... 358/107 |
| 4,457,622 | 7/1984 | Kato et al. .......................... 250/560 |
| 4,499,492 | 2/1985 | Hutchin ............................... 358/107 |
| 4,502,215 | 3/1985 | Davis et al. ......................... 406/83 |
| 4,576,482 | 3/1986 | Pryor ................................... 356/376 |
| 4,624,369 | 11/1986 | Okada ................................. 209/929 |

OTHER PUBLICATIONS

Conference: Proceedings of the Society of Photo Optical Instrumentation Engineers. Washington, D.C., U.S.A. (Apr. 19-20, 1979).

Primary Examiner—Leo H. Boudreau
Assistant Examiner—Jose L. Couso
Attorney, Agent, or Firm—Bruce A. Kaser

[57] ABSTRACT

A device is provided for automatically inspecting a fastener for defects prior to its installation in an assembly operation. The fastener is propelled by air or gravity along a feed line. The inspection device is connected in the feed line and has a cam member that is positionable into the fastener's path of travel for blocking it at a certain position. A television camera produces a video image of the stopped fastener, which shows the fastener's actual dimensions. A computer then compares the actual dimensions with the fastener's desired, which are prestored in the computer's memory. If the two substantially match, the fastener is known to be acceptable for installation.

14 Claims, 8 Drawing Sheets

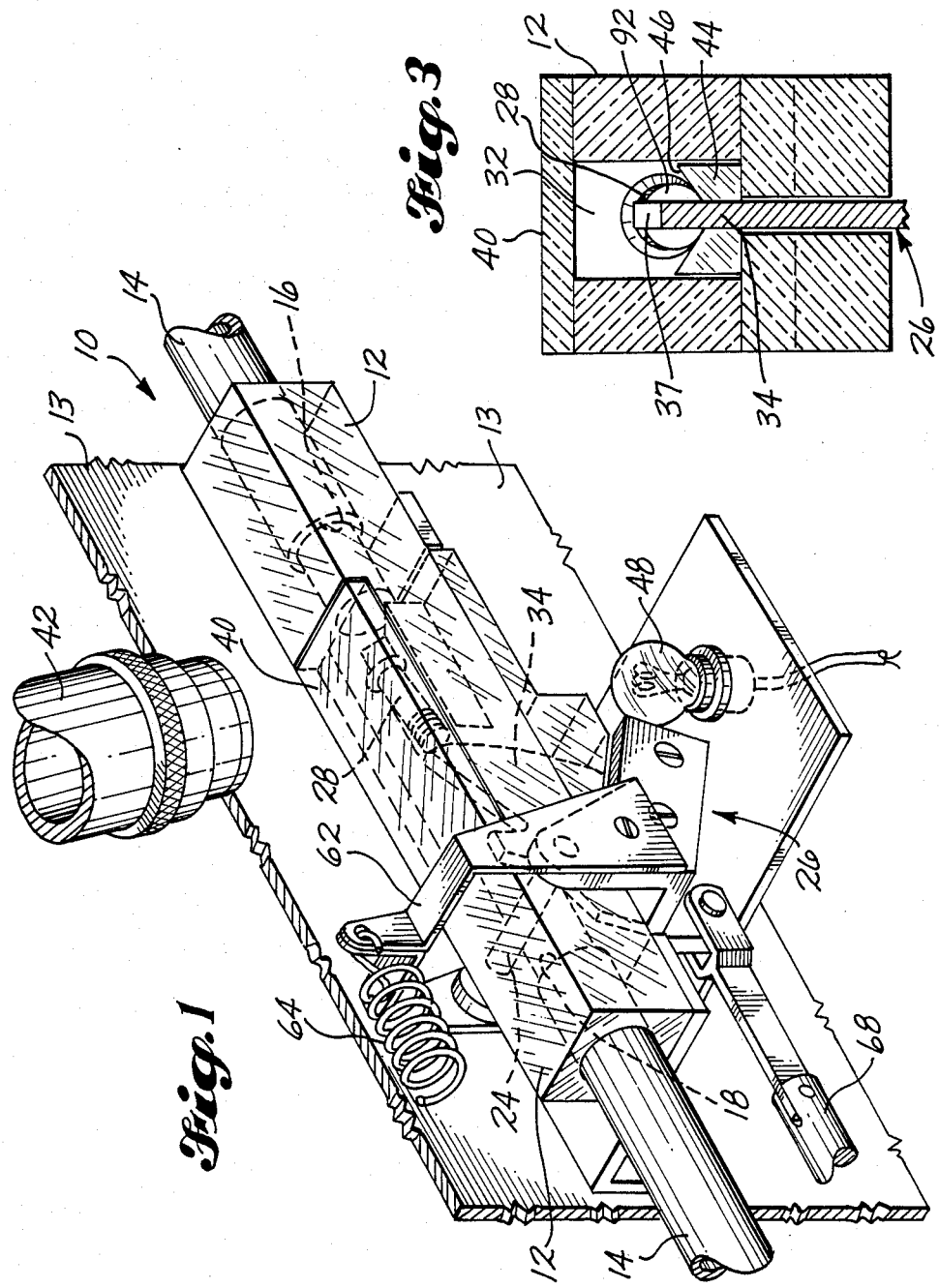

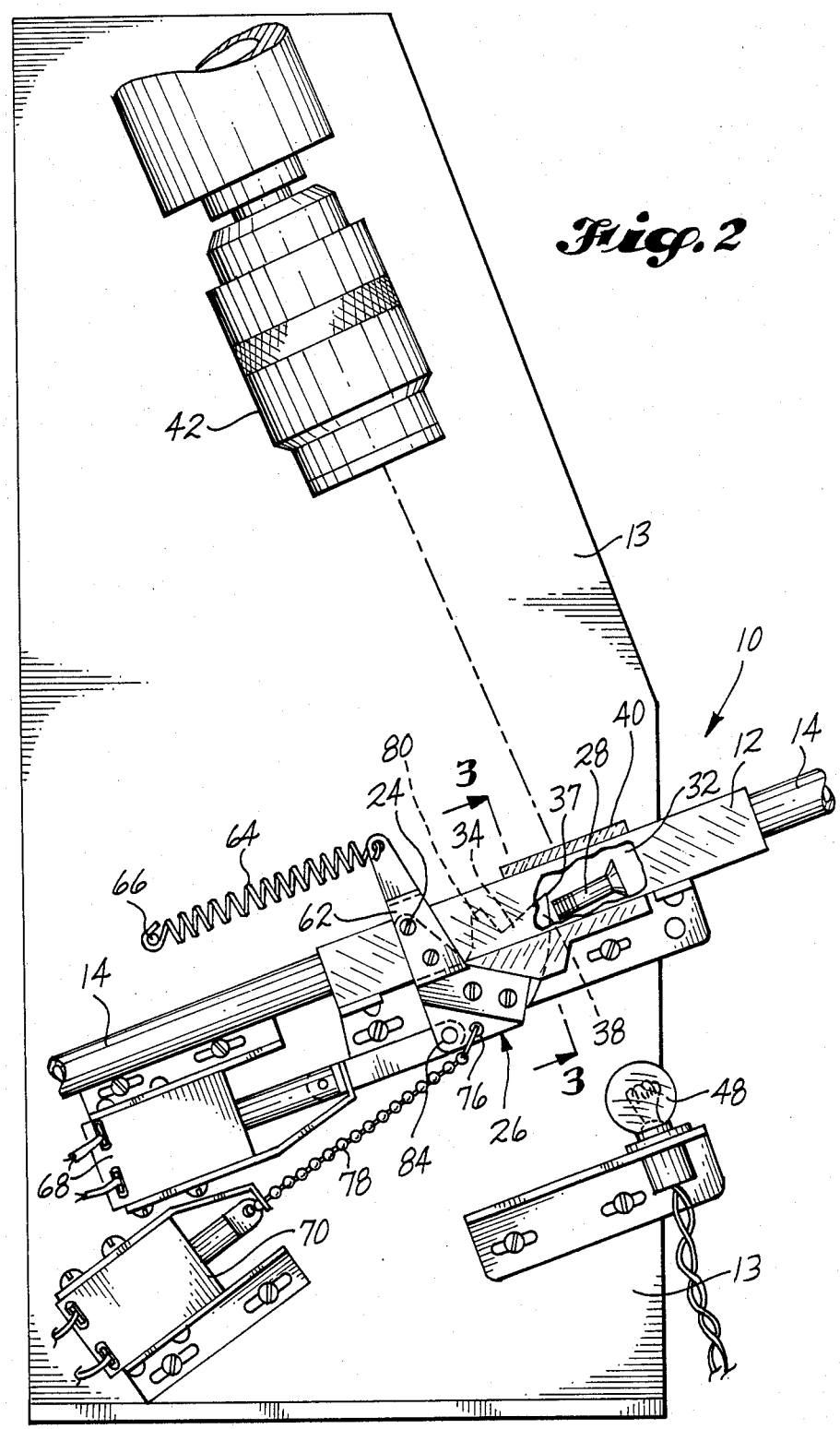

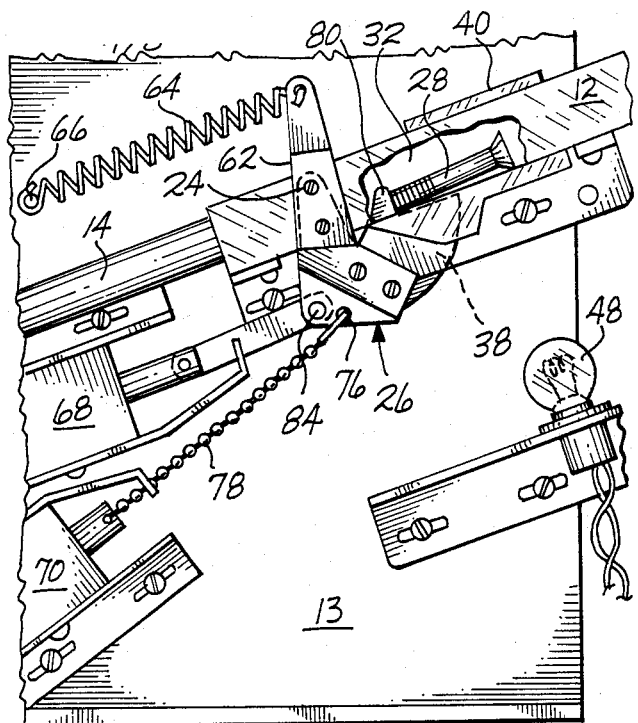
Fig.5
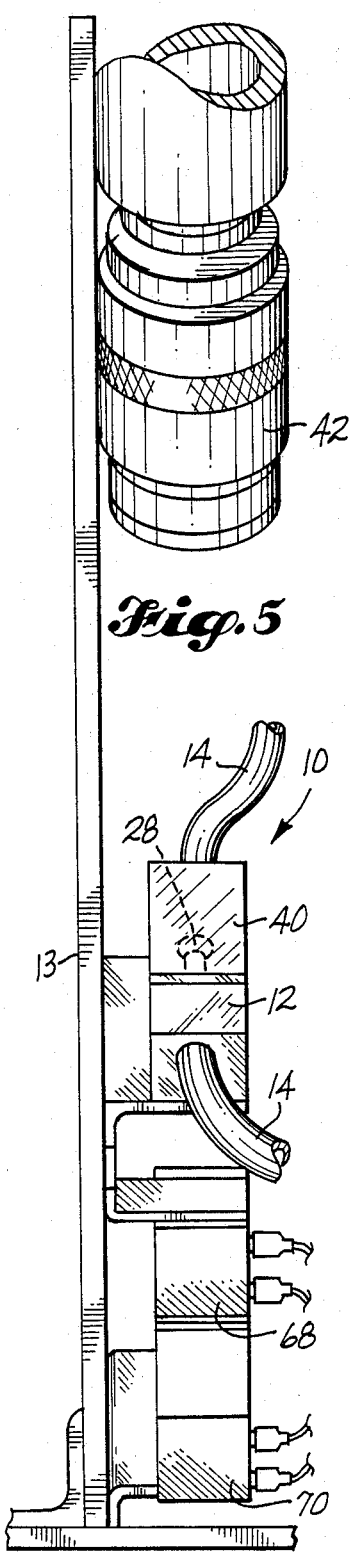
Fig.6
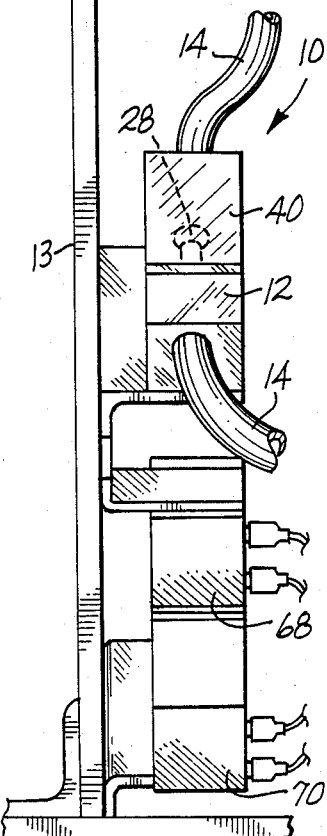
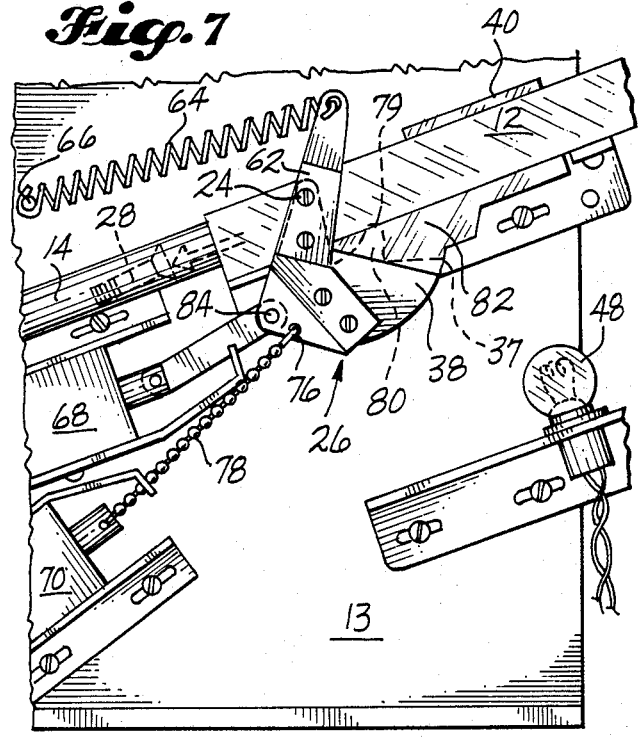
Fig.7

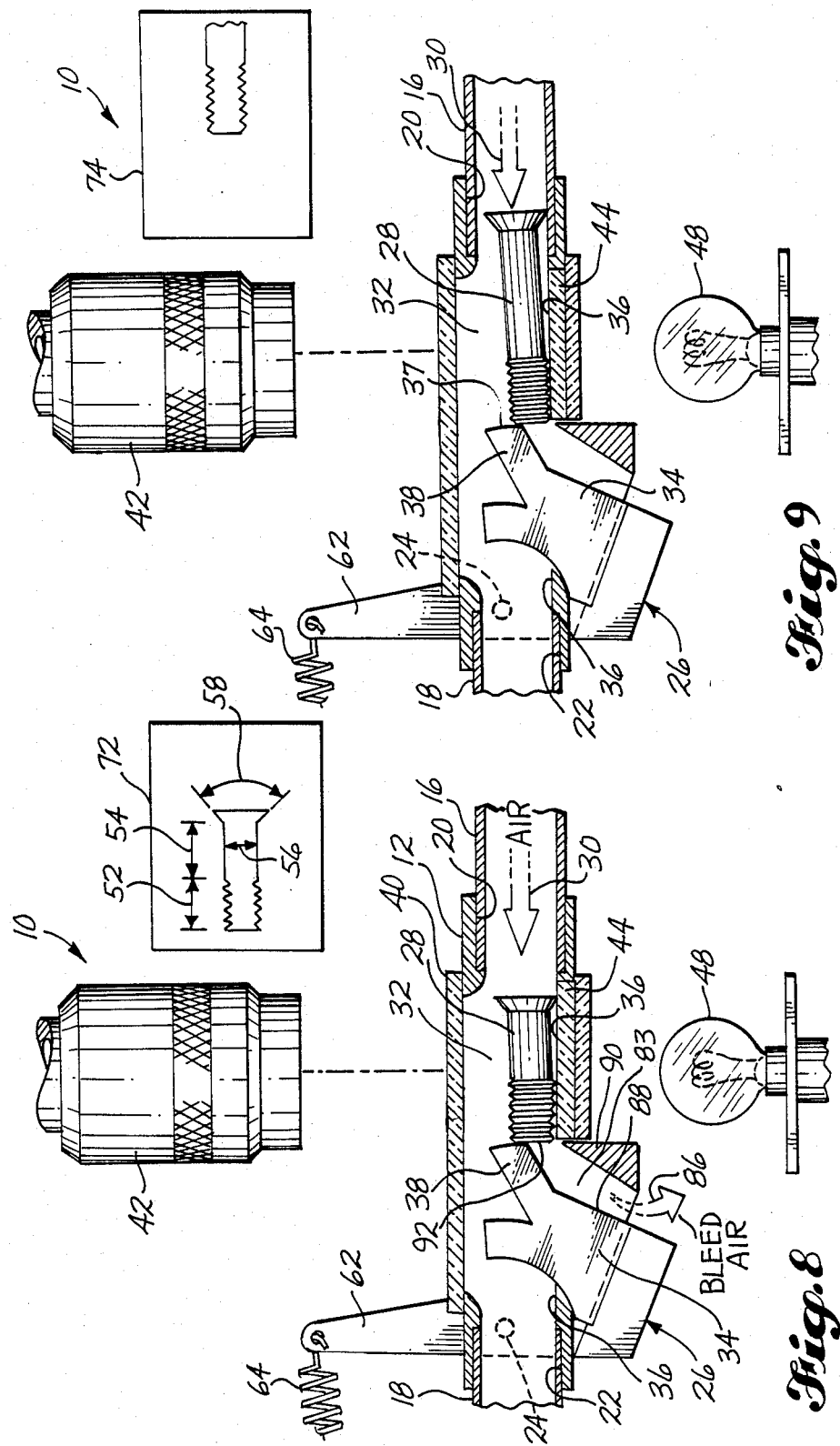

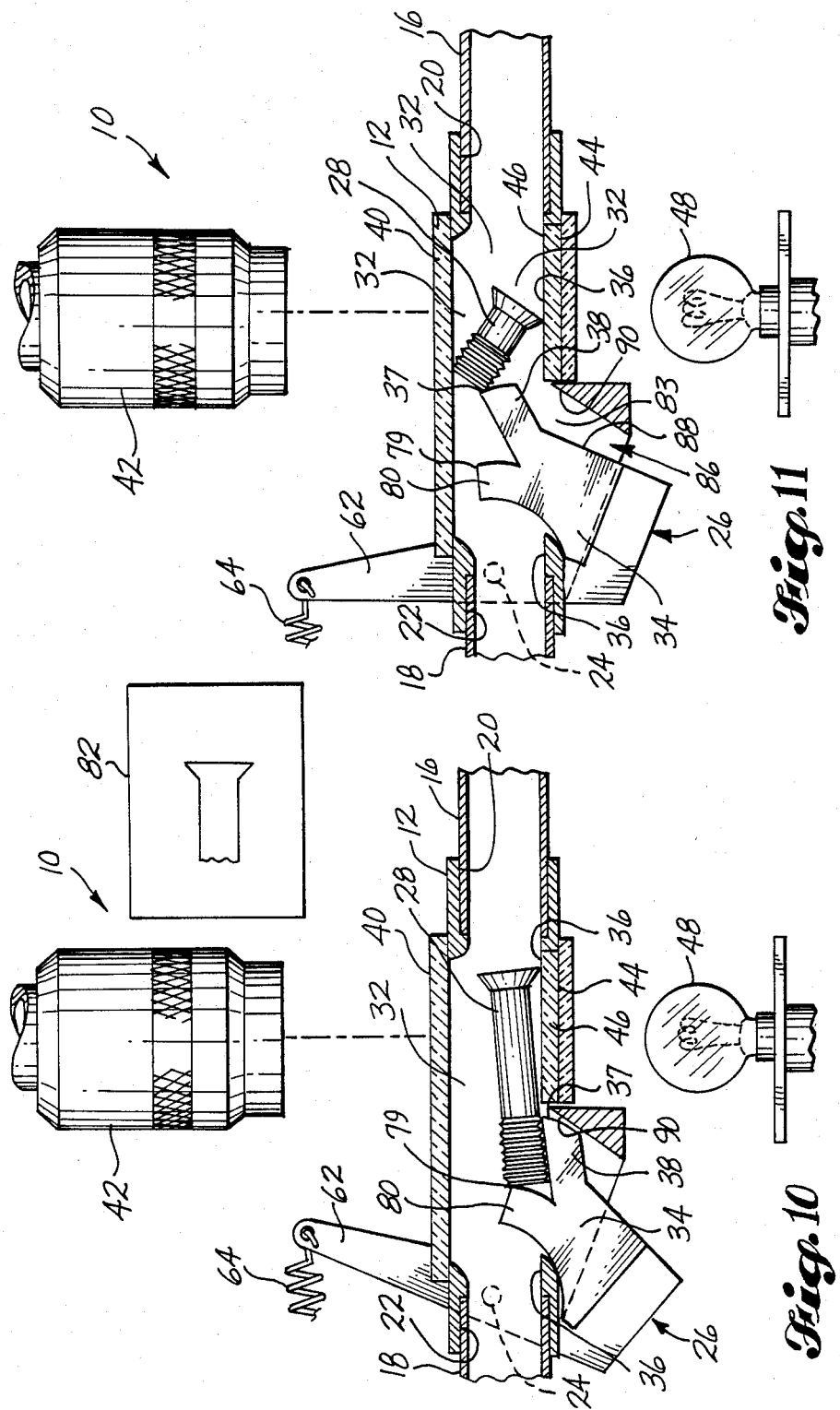

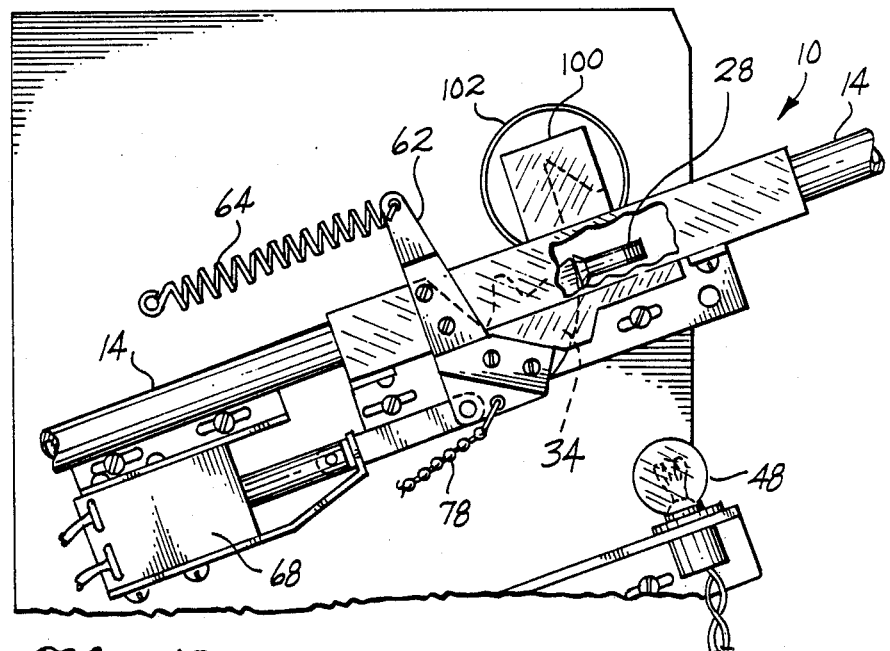
Fig. 13
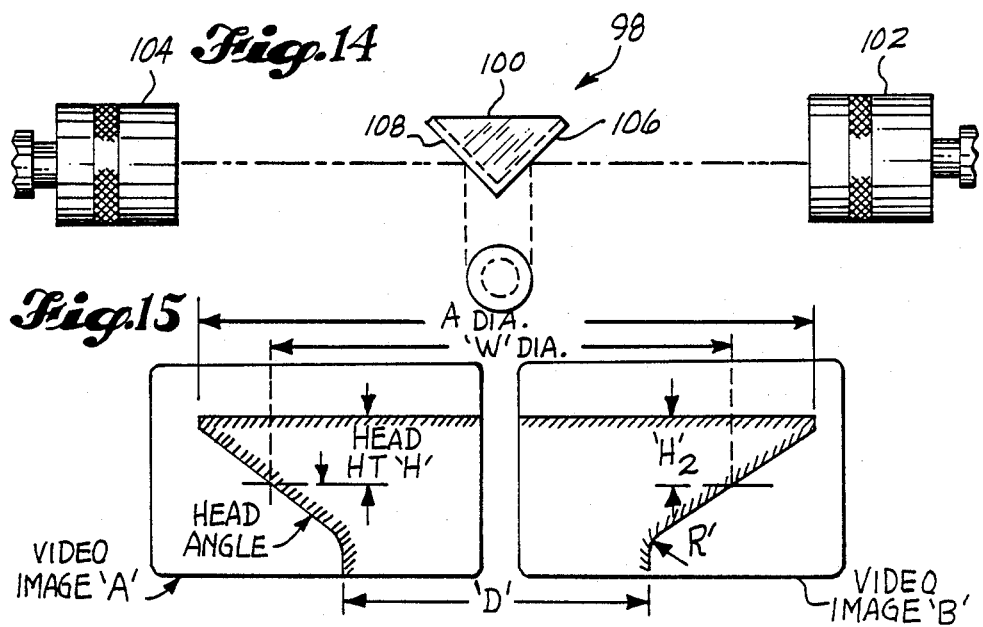
Fig. 14
Fig. 15

AUTOMATED FASTENER INSPECTION SYSTEM

DESCRIPTION

1. Technical Field

The invention disclosed herein generally relates to assembly operations, and to machines that install rivets and mechanical fasteners. More particularly, the invention relates to devices that inspect individual fasteners prior to installation.

2. Background Art

In assembly operations where mechanical fasteners are automatically installed by a machine, experience has shown that occasionally either a defective or incorrectly sized fastener is fed to the machine. Sometimes machine installation of such a fastener causes damage to the product being assembled, resulting in costly repairs or scrapping thereof. Other times a defective or incorrectly sized fastener is actually installed, and the defect is not detected by visual inspection or otherwise. This has the potential of causing service problems when the product is subsequently used.

In the past, the most cost effective way of addressing the above problem has been to have each fastener subjected to visual inspection by a machine operator or other worker. This type of approach, however, has inherent problems. First, visually inspecting hundreds, thousands, or tens of thousands of fasteners is such a boring task that it is difficult to perform efficiently. Second, and related to this is that the differences between certain kinds of fasteners are very slight and are difficult to detect by visual inspection unless great care is taken.

The present invention solves the various problems associated with manual inspection of fasteners. As will become apparent, it does so in a fashion that provides quick, automatic inspection prior to installation that is largely error free.

DISCLOSURE OF THE INVENTION

The present invention is designed to be used in a fastener feed line that transfers fasteners from a hopper, or the like, to a machine. Preferably, fasteners are propelled through the line by air pressure, although the invention could be used in a gravity feed line just as easily. The invention includes a body placed in the line that has a chamber connecting the upstream portion of the line with its downstream portion. This is done in a fashion so that the chamber provides a path along which the fastener travels through the body.

Pivotally attached to the body is a cam member that can rotate between a fastener stopping and fastener releasing position. In the stopping position, a portion of the cam member projects upwardly from the lower inner sidewall of the above-mentioned chamber in the body, thus blocking fastener travel, which stops the fastener at a certain location. When in the releasing position, this cam member fastener-blocking portion retracts into the chamber's sidewall thus permitting the fastener to continue traveling out through the chamber and down the feed line.

A camera produces a video image of the stopped fastener which shows actual fastener dimensions such as grip length, thread length, fastener diameter and angularity of the fastener's head. The dimensions for various fasteners to be inspected and used in a particular assembly operation are prestored in an image analyzing computer. The computer is operatively connected to the camera, and analyzes the video image, and compares the fastener's actual dimension shown thereby with the fastener's desired dimensions as indicated by the computer's prestored data. If the two do not substantially match, then it is known that the fastener is either defective, or of an incorrect type, or is otherwise undesirable. If this is the case, the fastener is rejected by removing it from the feed line downstream of the device. Otherwise, the fastener is allowed to pass on for use in the assembly operation.

It is an object of the invention to provide an automatic fastener inspection device that is fast and economical to use, and one that eliminates manual inspection of fasteners on a one-by-one basis. In this regard, it is a further object of the invention to verify thread presence on fasteners and to discriminate between threaded and grip-grooved fasteners.

Another object of the invention is to provide a device that is easy to integrate into currently existing and prospectively existing fastener feed systems. In air feed systems, for example, which are well-known, the device is easy to insert into an air feed line through which fasteners are propelled by merely cutting the line and plugging the device in between the cut sections.

It is still another object of the invention to provide a device that can automatically inspect fasteners, but which is as simple in construction and operation as is possible in order to keep the device's cost low.

As will become apparent upon reading the following description of the best mode for carrying out the invention, and when taken in conjunction with the accompanying drawings, a device constructed in accordance with the invention meets the above objects and others as well.

BRIEF DESCRIPTION OF THE DRAWINGS

In the drawings, like figures and reference numerals refer to like parts throughout the various views, and wherein:

FIG. 1 is a pictorial view of a mechanical fastener inspection device that automatically inspects fasteners, and is constructed in accordance with a preferred embodiment of the invention;

FIG. 2 is a side view of the device shown in FIG. 1;

FIG. 3 is a cross-sectional view taken along line 3—3 of FIG. 2;

FIG. 5 is an end view of the device shown in FIGS. 1 and 2;

FIG. 6 is an enlarged fragmentary side view showing the device stopping a fastener at a preselected position so that a video image of the fastener may be produced;

FIG. 7 is a view like FIG. 6, but shows the device releasing the fastener after the image is produced, thus permitting the fastener to travel onwardly downstream through a feed line;

FIG. 8 is a side cross-sectional view of a fastener viewing chamber, and of the end of a cam member which stops the fastener, and further schematically indicates the type of video image produced;

FIG. 9 is a view like FIG. 8, but shows the first step of a two-step procedure during which a combined image of a long fastener is produced;

FIG. 10 is a view like FIG. 9, but shows the second step of the two-step procedure;

FIG. 11 is a view like FIGS. 8–10, but shows how a jammed fastener may be freed;

FIG. 13 is a view like FIG. 2, but shows an alternative embodiment of the invention where a right-angle mirror system is used to produce a video image of the head of a fastener;

FIG. 14 is a schematic end view of the alternative embodiment shown in FIG. 13, and shows how a pair of video cameras may be used in combination with a right-angle mirror to produce an image of a fastener head; and FIG. 15 is a view of a fastener head as produced by the alternative embodiment shown in FIGS. 13 and 14.

BEST MODE FOR CARRYING OUT THE INVENTION

Figure 4:
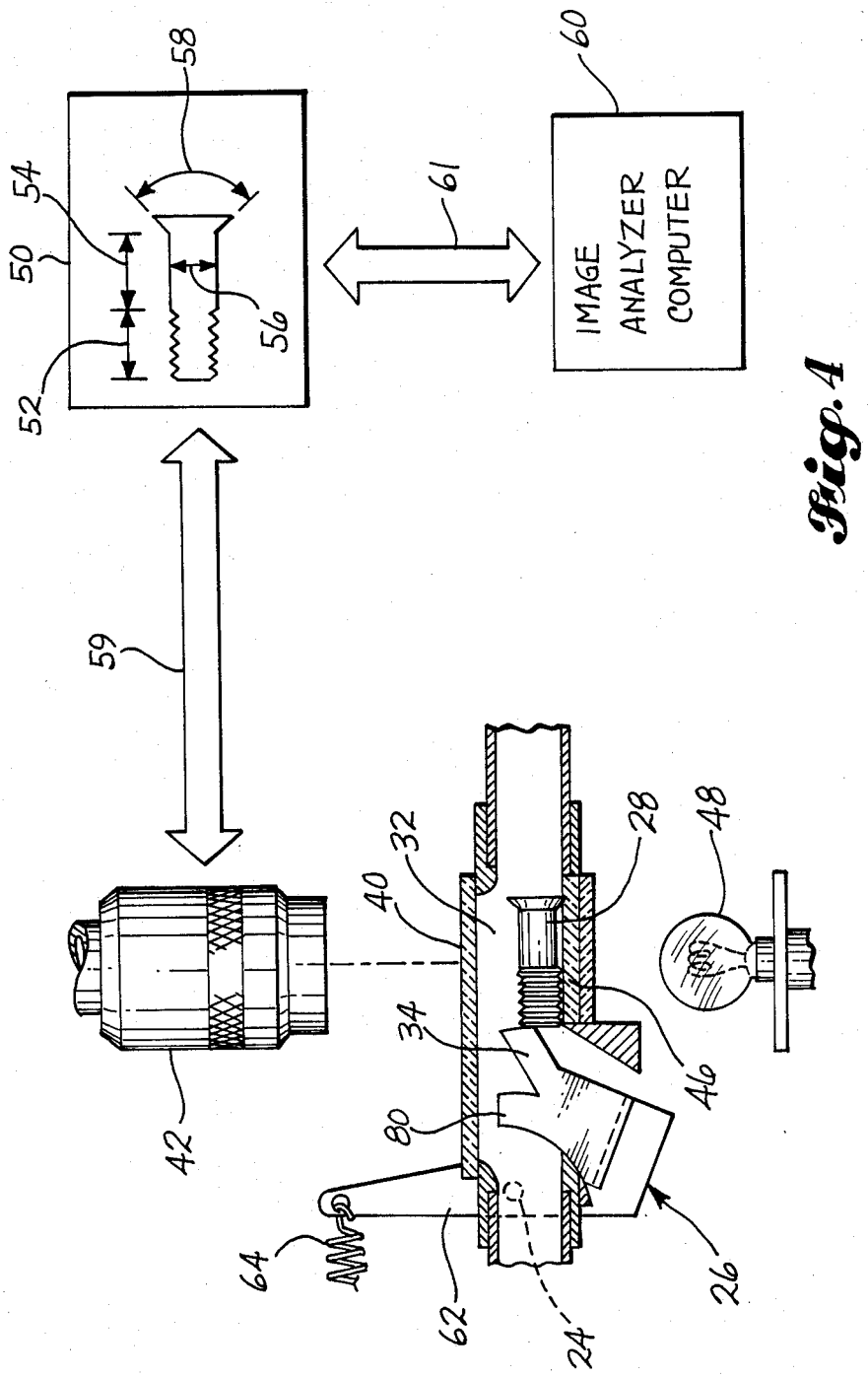
FIG. 4 is a schematic view showing how the inspection device operates, and shows how an image analyzing computer compares prestored fastener data with the actual dimensions of a fastener as represented by its video image.
Figure 12:
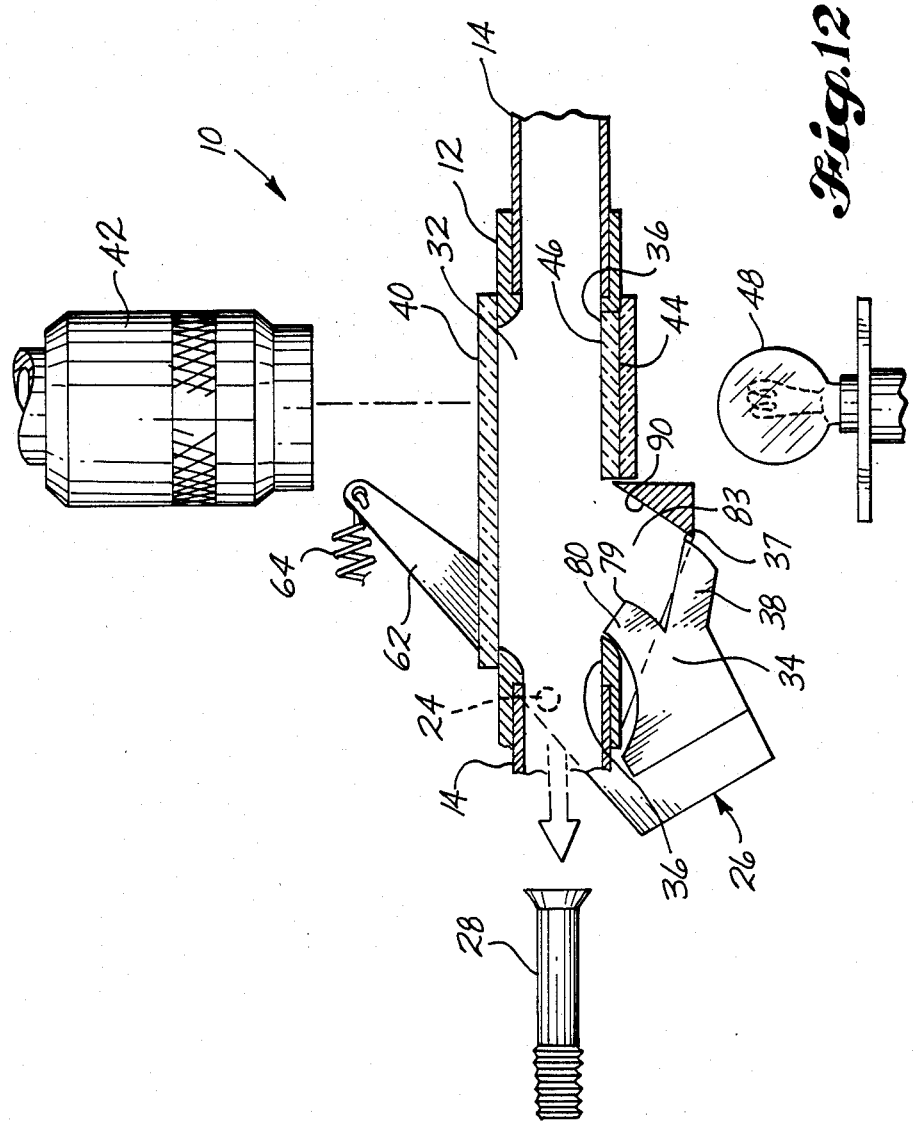
FIG. 12 is a view like FIGS. 8–11 but shows the release of the long fastener after its image is produced.

Referring now to the drawings, and first to FIG. 1, therein is shown at 10 an automated fastener inspection device constructed in accordance with a preferred embodiment of the invention. The device 10 includes an elongated rectangular body or block 12 that is mounted to a support 13. The device 10 is inserted into a fastener feed line 14 which is conventional in nature and is typically constructed of plastic, for example. Depending on the particular type of rivet feed system using the line 14, mechanical fasteners are propelled through the line by either gravity or air pressure. The block 12 is inserted in the line 14 by cutting it and inserting upstream and downstream cut ends 16, 18, respectively, into counterbores 20, 22 in each end of the block 12 (see FIGS. 8 and 9).

Pivotally connected to the block 12, by a pin 24, is a cam member indicated generally at 26 in FIGS. 1, 2 and 6–11. The cam member 26 is pivotable about the axis defined by pin 24 between a stopping and releasing position.

The various figures show an exemplary fastener 28 that is to be inspected prior to use in an assembly operation. The fastener 28 is propelled through the line 14, in the manner shown by arrow 30 in FIGS. 8–9, and into a chamber 32 inside the block 12. When rotated to the fastener stopping position, an end portion 34 of the cam member 26 projects upwardly from the lower inner sidewall 36 of the chamber 32. This is best seen in FIGS. 1, 2, 8 and 9. The fastener 28 abuts against the end 37 of cam member portion 34 which stops the fastener at a certain preselected or known location. The reader will note that the shape of the cam member's end portion 34 as depicted in FIGS. 1, 2, 6 and 7 is slightly different in comparison to its depiction in FIGS. 4, 8–11. In either set of drawings, however, the cam member 26 functions in exactly the same fashion. For reasons that will be explained later, the cam member 26 shown in the first set of Figs. might be more preferable when the device 10 is used in connection with a feed line where fastener travel is propelled by the force of gravity. The cam member 26 shown in the second set might be preferable when air is used to propel the fastener 28. In either case, the fastener blocking portion 34 of the cam member 26 has first and second fastener indexing portions 38, 40, the purpose and function of which will be further described.

A top portion of the block 12, positioned immediately above the chamber 32, is made of a transparent material 40. This material provides a viewing window that permits a video camera, the lens of which is indicated generally at 42, to produce a video image or picture of the fastener 28 when stopped. In order to provide sufficient light for the camera 42 a transparent lower portion 44 of the block 12 is positioned immediately below the fastener 28 and immediately upstream of the cam member 26. This portion 44 is also shaped to cradle the fastener 28 in the manner shown in FIG. 3. In this regard, it has an upwardly directed "V"-shaped portion 46 sized in such a manner that it causes the fastener to be nestled centrally in the chamber 32. This provides the camera 42 with a good view. Positioned below this is a conventional light source 48 that sheds adequate light on the fastener 28 for the camera 42.

Referring now to FIG. 4, the camera 42 produces a picture or video image as indicated at 50. The picture is sufficiently clear and accurate to indicate fastener thread length 52, grip length 54, diameter 56, and the degree of the fastener's head angle 58. The picture also indicates whether the threads are helical or parallel. This corresponds, respectively, to either a threaded or a grip-grooved fastener.

The produced picture or image 50 is received by an image analyzer computer 60. The computer 60 has prestored in its memory certain fastener dimensional data for a variety of fasteners whose use in an assembly operation is anticipated. The computer 60 compares the actual dimensions of the fastener, as shown in the image 50, with the computer's prestored data and determines whether the fastener is (a) defective; or (b) of the correct type. If the actual dimensions match or substantially match the desired dimensions as stored in the computer's memory, then the fastener is known to be acceptable and is permitted to travel downstream through the line 14 to the assembly operation. If not, the fastener is removed from the line 14 at a location downstream of the device 10.

The above-described means for producing the video image 50, and for analyzing the fastener dimensions shown in the image, are of a conventional nature and would be familiar to a person skilled in the art. For example, a person skilled in the art would be familiar with the camera technology required to produce the image 50, and with the type of computer or microprocessor, including software programming thereof, which would be operatively connected to the camera 42, as schematically indicated by arrows 59 and 61 in FIG. 4.

Once the fastener's video image is produced, the cam member 26 is then rotated into a fastener releasing position as shown in FIG. 7. In this position, the cam member's projecting or fastener blocking end 34 is retracted into the lower inner sidewall 36 of the chamber 32, which releases the fastener 28 and permits it to travel downstream. After the fastener 28 leaves the chamber, the cam member is rotated back into the stopping position for analyzing subsequent fasteners.

In preferred form, the cam member 26 has a forked portion, indicated at 62 in FIG. 1, which surrounds the block 12. Attached to the upper side of the fork 62 is a spring 64 that is further attached by a pin 66 to the device's supporting structure 13. The spring 64 normally pulls the cam member into the stopping position. The cam member is rotated into the releasing position by one of two solenoid-operated actuators 68, 70.

Directing attention again to FIGS. 8 and 9, the transparent viewing window 40 provides the camera 42 with a limited field of view. Certain fasteners are sufficiently short so that their entire length can be viewed through the window 40, and a single image thereof can be produced. This is shown schematically at 72 in FIG. 8. Other kinds of fasteners are longer, and a video image of them must be produced in two steps. In this situation, the fastener 28 is stopped in a first position or location by the end 37 of the cam member's first indexing portion 38 (see FIG. 9). The camera 42 then produces a video image of the forward portion of the fastener 28 as indicated schematically at 74. Then, the second solenoid-operated actuator 70 is activated. This actuator 70 is connected at 76 to the cam member by a chain 78 and it causes the cam member 26 to rotate slightly to an intermediate stopping position (see FIG. 10). This position is between the stopping and releasing positions shown in FIGS. 1, 2, 8 and FIGS. 7, 12 and the cam member 26 is rotated sufficiently so that its first indexing portion 38 retracts into an opening 82 in the chamber's lower inner sidewall 36. This permits the fastener 38 to further move downstream until it abuts against the end 79 of the cam member's second indexing portion 80. The camera 42 then produces a second video image, as shown at 82, but of the fastener's trailing end portion.

The image analyzing computer 60 sums the dimensions shown in the first and second images to determine the total actual dimensions of the fastener. Once this is done, the first actuator 68, which is connected to the cam member 26 at 84, is activated. This causes the cam member 26 to further rotate into the releasing position shown in FIGS. 7 and 12 where the second indexing portion 80 is fully retracted into the opening 82 in the chamber's lower sidewall 36.

It should be appreciated that when a short fastener is inspected, it is only necessary to activate the first actuator 68 in order to release the fastener 28. Both actuators 68, 70 are used only in situations where fasteners of extended length are inspected.

As mentioned previously, the invention is adaptable for use in either air or gravity feed lines. Directing attention now to FIG. 11, the cam member 26 shown therein is shaped so that when in the first stopping position an air bleed path 86 is provided between the upstream side 88 of the cam member and the edge 90 of the opening 82. In this position bleed air traveling through path 86 tends to pull the fastener's leading end 92 downwardly against the end 37 of the first indexing portion 38. This is preferred because it prevents fastener jamming of the type shown in FIG. 11. In the event a fastener actually jams, in preferred form one of the two actuators 68, 70 may be activated briefly to unjam the fastener. For this reason, the embodiment shown in FIGS. 4 and 8–11 may be preferable for use in connection with an air feed line.

Still another alternative embodiment of the invention is shown in FIGS. 13–15. In this embodiment, a right-angle mirror system, indicated generally at 98 in FIG. 14, is used to provide a video image of only a fastener head. Using this system 98 in connection with the device 10 may require replacement of the previously described camera 42 with a right-angle mirror 100 positioned directly above transparent window 40. A pair of cameras 100, 102 one on each side of the mirror, would produce a video image of each camera's respective mirror faces 106, 108. The images from both cameras are shown in FIG. 15, for example, where video image "A" represents the image received from camera 104 in FIG. 14 and video image "B" indicates the image produced by video camera 102. As seen in FIG. 13, it may be preferable to feed the fastener 28 into the device 10 in a position that is reversed from the fastener position shown in FIGS. 1–12. The fastener 28 is accurately positioned relative to the mirror 100 by the previously described transparent "V"-shaped portion of the chamber 46.

Video images A and B shown in FIG. 15 have a fixed relationship with respect to the mirror 100 and "V"-shaped portion 46 so that a certain vertical line on the video images is known to represent the "W" gauge dimension for the head of each fastener inspected. FIG. 15 illustrates this relationship between images A and B. A gauge pin for the "W" dimension is used to establish this vertical line relationship. Knowing this relationship permits determination of fastener head height "H", head angle and other parameters "A". These parameters may be compared to prestored or preestablished standards stored in the previously described computer 60.

It is to be appreciated that the above description of the invention is not to be taken in a limiting sense. It is conceivable, for example, that many changes could be made to the above-described structure without departing from the spirit and scope of the invention. In this regard, it is intended that patent coverage in this case is to be limited only by the subjoined claims, wherein the interpretation of such claims is to be made in accordance with the established doctrines of patent claim interpretation.

What is claimed is:

1. In an assembly operation in which a mechanical fastener is used, said fastener being moved along a feed path to said assembly operation, a device for inspecting said fastener prior to use in said assembly operation, comprising:

a body positioned in said path, and having a chamber through which said fastener travels;

a cam member pivotally connected to said body, said cam member being rotatable between a fastener stopping position and a fastener releasing position, wherein when said cam member is in said fastener stopping position a blocking portion of said cam member projects into said chamber, to stop fastener travel and to hold said fastener at a certain preselected location in said chamber, and when said cam member is in said releasing position said blocking portion of said cam member is moved out of said chamber, in a manner so that said fastener may travel therethrough;

spring means, connected to said cam member, for normally rotating said cam member into said fastener stopping position;

cam member release means operable for rotating said cam member in opposition to said spring means and in a direction from said fastener stopping position to said fastener releasing position;

camera means operable for producing an image showing the actual dimensions of said fastener; and image analyzer means operable for comparing said actual fastener dimensions provided by said camera means with certain preidentified desirable fastener dimensions, wherein said cam member is further operable to release said fastener after said camera means produces said image, and wherein if said actual dimensions of said fastener substantially match said preidentified desirable dimensions said fastener is known to be acceptable for use in said assembly operation.

2. The device of claim 1, wherein said preselected location at which said fastener travel is stopped is a first location, and wherein said fastener stopping position of said cam member is a first fastener stopping position, and wherein said blocking portion of said cam member is shaped to include first and second indexing portions, said first indexing portion projecting into said chamber upstream of said second indexing portion relative to the direction of fastener travel when said cam member is in said first fastener stopping position, said first indexing portion having an end against which said moving fastener abuts, and which defines said first fastener stopping location, said cam member being rotatable to a second fastener stopping position that is rotationally intermediate of said first stopping position and said releasing position, said first and second indexing portions of said cam member being shaped in a manner so that said first indexing portion moves out of said chamber when said cam member is rotated into said second fastener stopping position, to release said fastener from said first location, and with said second indexing portion projecting into said chamber when said cam member is in said second fastener stopping position, said second indexing portion having an end against which said fastener abuts and stops, that defines a second preselected location downstream of said first location at which fastener travel is stopped, and further, said second indexing portion moving out of said chamber when said cam member is moved from said second fastener stopping position to said releasing position, in a manner so as to release said fastener from said second preselected location.

3. The device of claim 2, wherein said cam member release means includes:

a first solenoid-activated actuator connected to said cam member, and operable for rotating said cam member from said first stopping position to said second stopping position, and a second solenoid- activated actuator also connected to said cam member, and operable for rotating said cam member from any one of said first and second stopping positions to said releasing position.

4. The device of claim 1, wherein said fastener is moved along said path and through said chamber by a stream of pressurized air, and wherein said cam member extends through an opening in a lower inner sidewall of said chamber, said cam member being shaped so that said blocking portion thereof projects upwardly from said opening into said chamber when said cam member is in said fastener stopping position, and said cam member is further shaped so that a bleed air path is defined between said cam member and the edge of said opening when said cam member is in said fastener stopping position, said bleed air path causing said pressurized air to pull said fastener downwardly, said cam member being still further shaped in a manner so that said cam member closes said air bleed path when said cam member is rotated into said fastener releasing position.

5. The device of claim 1, wherein said chamber further includes a fastener cradling sidewall positioned adjacent said certain preselected location where said fastener is stopped, said fastener cradling side wall portion being shaped to hold said fastener substantially centrally in said chamber when said fastener's travel is stopped.

6. The device of claim 5, wherein said fastener cradling side wall portion has an upwardly directed "V" shape.

7. The device of claim 5, wherein said cradling portion is made of a light-transparent material, and including a fastener viewing window positioned in an upper sidewall of said chamber above said cradling portion, to provide a view of said location at which said fastener is stopped, wherein said camera means is positioned immediately above said viewing window, and further including a light source positioned below said cradling portion for providing sufficient light into said chamber so that said camera means may produce a video image of said fastener.

8. In an assembly operation in which a mechanical fastener is used, said fastener being moved along a feed path to said assembly operation, a device for inspecting said fastener prior to use in said assembly operation, comprising:

a body positioned in said path, and having a chamber through which said fastener travels;

a cam member pivotally connected to said body, said cam member being rotatable between a fastener stopping position and a fastener releasing position, wherein when said cam member is in said fastener stopping position a blocking portion of said cam member projects into said chamber, to stop fastener travel and to hold said fastener at a certain preselected location in said chamber, and when said cam member is in said fastener releasing position, said blocking portion of said cam member is moved out of said chamber in a manner so that said fastener may travel therethrough;

spring means, connected to said cam member, for normally rotating said cam member into said fastener stopping position; and cam member release means operable for rotating said cam member in opposition to said spring means and in a direction from said fastener stopping position to said fastener releasing position.

9. The device of claim 8, wherein said preselected location at which fastener travel is stopped is a first location, and wherein said fastener stopping position of said cam member is a first fastener stopping positin, and wherein said blocking portion of said cam member is shaped to include first and second indexing portions, said first indexing portion projecting into said chamber upstream of said second indexing portion relative to the direction of fastener travel when said cam member is in said first fastener stopping position, said first indexing portion having an end against which said moving fastener abuts, and which defines said first fastener stopping location, said cam member being rotatable to a second fastener stopping position that is rotationally intermediate of said first stopping position and said releasing position, said first and second indexing portions of said cam member being shaped in a manner so that said first indexing portion moves out of said chamber when said cam member is rotated into said second fastener stopping position, to release said fastener from said first location, and with said second indexing portion projecting into said chamber when said cam member is in said second fastener stopping position, said second indexing portion having an end against which said fastener abuts and stops, that defines a first preselected location downstream of said first location at which fastener travel is stopped, and further, said second indexing portion being out of said chamber when said cam member is moved from said second fastener stopping position to said releasing position, in a manner so as to release said fastener from said second preselected location.

10. The device of claim 9, wherein said cam member release means includes:
   a first solenoid-activated actuator connected to said cam member, and operable for rotating said cam member from said first stopping position to said second stopping position, and
   a second solenoid-activated actuator also connected to said cam member, and operable for rotating said cam member from any one of said first and second fastener stopping position to said releasing position.

11. The device of claim 8, wherein said fastener is moved along said path and through said chamber by a stream of pressurized air, and wherein said cam member extends through an opening in a lower inner side wall of said chamber, sid cam member being shaped so that said blocking portion thereof projects upwardly from said opening into said chamber when said cam member is in said fastener stopping position, and said cam member is further shaped so that a bleed air path is defined between said cam member and the edge of said opening when said cam member is in said fastener stopping position, said bleed air path causing said pressurized air to pull said fastener downwardly, said cam member being still further shaped in a manner so that said cam member closes said air bleed path when said cam member is rotated into said fastener releasing position.

12. The device of claim 8, wherein said chamber further includes a fastener cradling side wall portion positioned adjacent said certain preselected location where said fastener is stopped, said fastener cradling side wall portion being shaped to hold said fastener substantially centrally in said chamber when said fastener's travel is stopped.

13. The device of claim 12, wherein said fastener cradling side wall portion has an upwardly directed "V" shape.

14. The device of claim 12, wherein said cradling portion is made of a light-transparent material, and including a fastener viewing window positioned in an upper side wall of said chamber above said cradling portion, to provide a view of said location at which said fastener is stopped from outside said chamber.

* * * * *

UNITED STATES PATENT AND TRADEMARK OFFICE
CERTIFICATE OF CORRECTION

PATENT NO. : 4,823,396
DATED : April 18, 1989
INVENTOR(S) : Douglas Thompson

It is certified that error appears in the above-identified patent and that said Letters Patent is hereby corrected as shown below:

Claim 5, column 7, line 65, after "sidewall", insert --portion--.

Claim 9, column 8, line 46, "positin" should be --position--.

Claim 9, column 9, line 2, "first" should be --second--.

Claim 10, column 9, line 19, "position" should be --positions--.

Claim 11, column 9, line 24, "sid" should be --said--.

Signed and Sealed this

Seventh Day of May, 1991

Attest:

HARRY F. MANBECK, JR.

Attesting Officer

Commissioner of Patents and Trademarks